United States Patent
Jain et al.

(10) Patent No.: US 10,275,525 B2
(45) Date of Patent: Apr. 30, 2019

(54) METHOD AND SYSTEM FOR MINING TRENDS AROUND TRENDING TERMS

(75) Inventors: Vidit Jain, Bangalore (IN); Nikhil Rasiwasia, Bangalore (IN)

(73) Assignee: Excalibur IP, LLC, New York, NY (US)

( * ) Notice: Subject to any disclaimer, the term of this patent is extended or adjusted under 35 U.S.C. 154(b) by 434 days.

(21) Appl. No.: 13/517,603

(22) Filed: Jun. 14, 2012

(65) Prior Publication Data

US 2013/0339354 A1   Dec. 19, 2013

(51) Int. Cl.
*G06F 17/30* (2006.01)
(52) U.S. Cl.
CPC .. *G06F 17/30864* (2013.01); *G06F 17/30598* (2013.01); *G06F 17/30705* (2013.01)
(58) Field of Classification Search
None
See application file for complete search history.

(56) References Cited

U.S. PATENT DOCUMENTS

| | | | | |
|---|---|---|---|---|
| 9,015,168 B2* | 4/2015 | Cai | .................. | G06F 17/30864 707/708 |
| 2007/0226198 A1* | 9/2007 | Kapur | .............................. | 707/3 |
| 2008/0082499 A1* | 4/2008 | Koski | .............................. | 707/3 |
| 2012/0131013 A1* | 5/2012 | Hobbs et al. | ................. | 707/748 |
| 2012/0226678 A1* | 9/2012 | Park | ...................... | G06Q 10/10 707/709 |
| 2012/0271829 A1* | 10/2012 | Jason | .................. | G06F 17/3061 707/740 |
| 2012/0278064 A1* | 11/2012 | Leary | .................... | G06F 17/274 704/9 |
| 2013/0036107 A1* | 2/2013 | Benyamin et al. | ........... | 707/709 |
| 2013/0144869 A1* | 6/2013 | Shalabi et al. | ................ | 707/722 |
| 2013/0298000 A1* | 11/2013 | Zuccarino et al. | ........... | 715/205 |
| 2013/0304818 A1* | 11/2013 | Brumleve et al. | ............ | 709/204 |

* cited by examiner

*Primary Examiner* — Rehana Perveen
*Assistant Examiner* — Raheem Hoffler
(74) *Attorney, Agent, or Firm* — Brinks Gilson & Lione

(57) ABSTRACT

A method and system for mining trends around trending terms. The method includes determining a plurality of articles, from one or more websites, in relation to a first entity for a time period. The first entity is a trending term. The method also includes generating comment clusters for the plurality of articles. Each comment cluster is generated for associated article and includes plurality of user comments. The method further includes extracting one or more entities from plurality of user comments for each of the comment clusters, the one or more entities related to the first entity. Further, the method includes enabling selection of a second entity, from the one or more entities, by the user. Moreover, the method includes rendering one or more user comments corresponding to the first entity and the second entity for the time period. The system includes an electronic device, communication interface, memory, and processor.

22 Claims, 3 Drawing Sheets

METHOD AND SYSTEM FOR MINING TRENDS AROUND TRENDING TERMS

TECHNICAL FIELD

Embodiments of the disclosure relate to the field of mining trends around trending terms.

BACKGROUND

Currently, there is an increased interest among users to follow current trends on the Internet. Such trends are usually hosted in a trending module on different web pages as trending terms. On selecting one of the trending terms, a corresponding search results page is displayed. However, the users have to go through multiple search results to determine why a trending term is trending which is a time consuming process. Moreover, the users are not able to determine development of relationships between different trending terms over time.

In light of the foregoing discussion, there is a need for a method and system for an efficient technique to discover or mine trends around trending terms.

SUMMARY

The above-mentioned needs are met by a method, a computer program product and a system for mining trends around trending terms.

An example of a method of mining trends around trending terms includes determining a plurality of articles, from one or more websites, in relation to a first entity for a time period. The first entity is a trending term. The method also includes generating comment clusters for the plurality of articles. Each comment cluster is generated for an associated article and includes a plurality of user comments. The method further includes extracting one or more entities from plurality of user comments for each of the comment clusters, the one or more entities related to the first entity. Further, the method includes enabling selection of a second entity, from the one or more entities, by the user. Moreover, the method includes rendering one or more user comments corresponding to the first entity and the second entity for the time period.

An example of a computer program product stored on a non-transitory computer-readable medium that when executed by a processor, performs a method of mining trends around trending terms includes determining a plurality of articles, from one or more websites, in relation to a first entity for a time period. The first entity is a trending term. The computer program product also includes generating comment clusters for the plurality of articles. Each comment cluster is generated for an associated article and includes a plurality of user comments. The computer program product further includes extracting one or more entities from plurality of user comments for each of the comment clusters, the one or more entities related to the first entity. Further, the computer program product includes enabling selection of a second entity, from the one or more entities, by the user. Moreover, the computer program product includes rendering one or more user comments corresponding to the first entity and the second entity for the time period.

An example of a system for mining trends around trending terms includes an electronic device. The system also includes a communication interface in electronic communication with the electronic device. The system further includes a memory that stores instructions, and a processor. The processor is responsive to the instructions to determine a plurality of articles, from one or more websites, in relation to a first entity for a time period, the first entity being a trending term. The processor is also responsive to the instructions to generate comment clusters for the plurality of articles, each comment cluster generated for an associated article and including a plurality of user comments. The processor is further responsive to the instructions to extract one or more entities from the plurality of user comments for each of the comment clusters, the one or more entities related to the first entity, to enable selection of a second entity, from the one or more entities, by the user, and to render one or more user comments corresponding to the first entity and the second entity for the time period.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE EMBODIMENTS

The above-mentioned needs are met by a method, computer program product and system for mining trends around trending terms. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
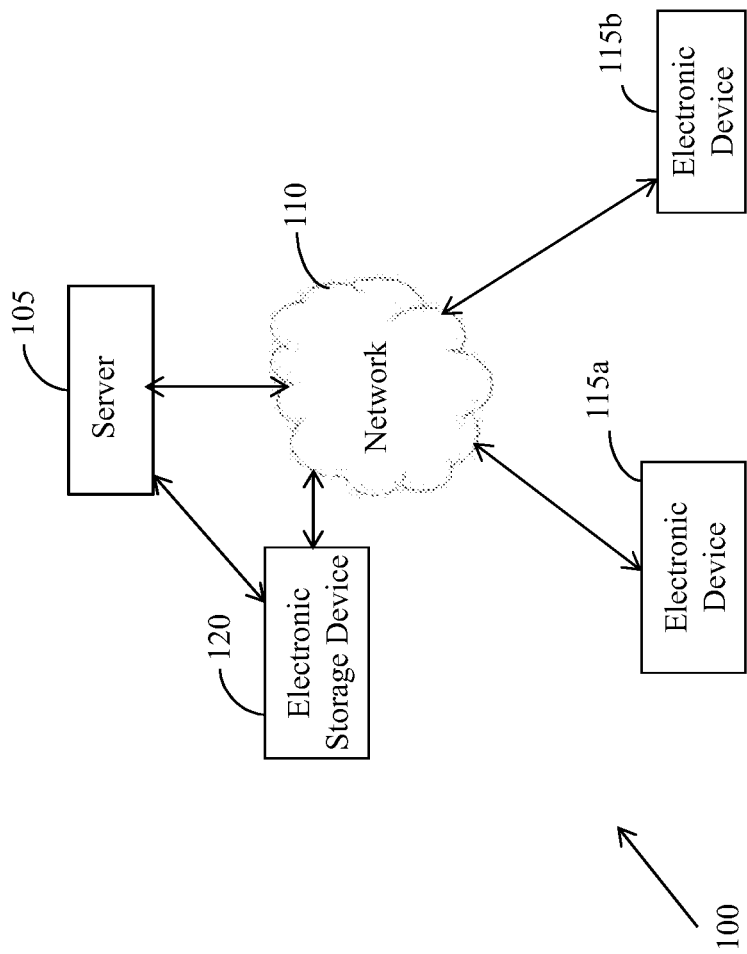
FIG. 1 is a block diagram of an environment, in accordance with which various embodiments can be implemented.

FIG. 1 is a block diagram of an environment 100, in accordance with which various embodiments can be implemented.

The environment 100 includes a server 105 connected to a network 110. The environment 100 further includes one or more electronic devices, for example an electronic device 115a and an electronic device 115b, which can communicate with each other through the network 110. Examples of the electronic devices include, but are not limited to, computers, mobile devices, tablets, laptops, palmtops, hand held devices, telecommunication devices, and personal digital assistants (PDAs).

The electronic devices can communicate with the server 105 through the network 110. Examples of the network 110 include, but are not limited to, a Local Area Network (LAN), a Wireless Local Area Network (WLAN), a Wide Area Network (WAN), internet, and a Small Area Network (SAN). The electronic devices associated with different users can be remotely located with respect to the server 105.

The server 105 is also connected to an electronic storage device 120 directly or via the network 110 to store information, for example a plurality of articles and a plurality of user comments.

In some embodiments, different electronic storage devices are used for storing the information.

The server 105, for example a Yahoo!® server, determines a plurality of articles, from one or more websites, in relation to a first entity for a time period, the first entity being a trending term. The server 105 generates comment clusters for the articles, each comment cluster generated for an associated article and including a plurality of user comments. The server 105 also extracts one or more entities from the user comments for each of the comment clusters, the entities related to the first entity. The server 105 further enables selection of a second entity, from the one or more entities, by the user. The server 105 further renders one or more user comments corresponding to the first entity and the second entity for the time period. Hence, on receiving the first entity and the time period as inputs from the user, the server 105 generates the entities and the one or more user comments that are further displayed to the user.

Figure 2:
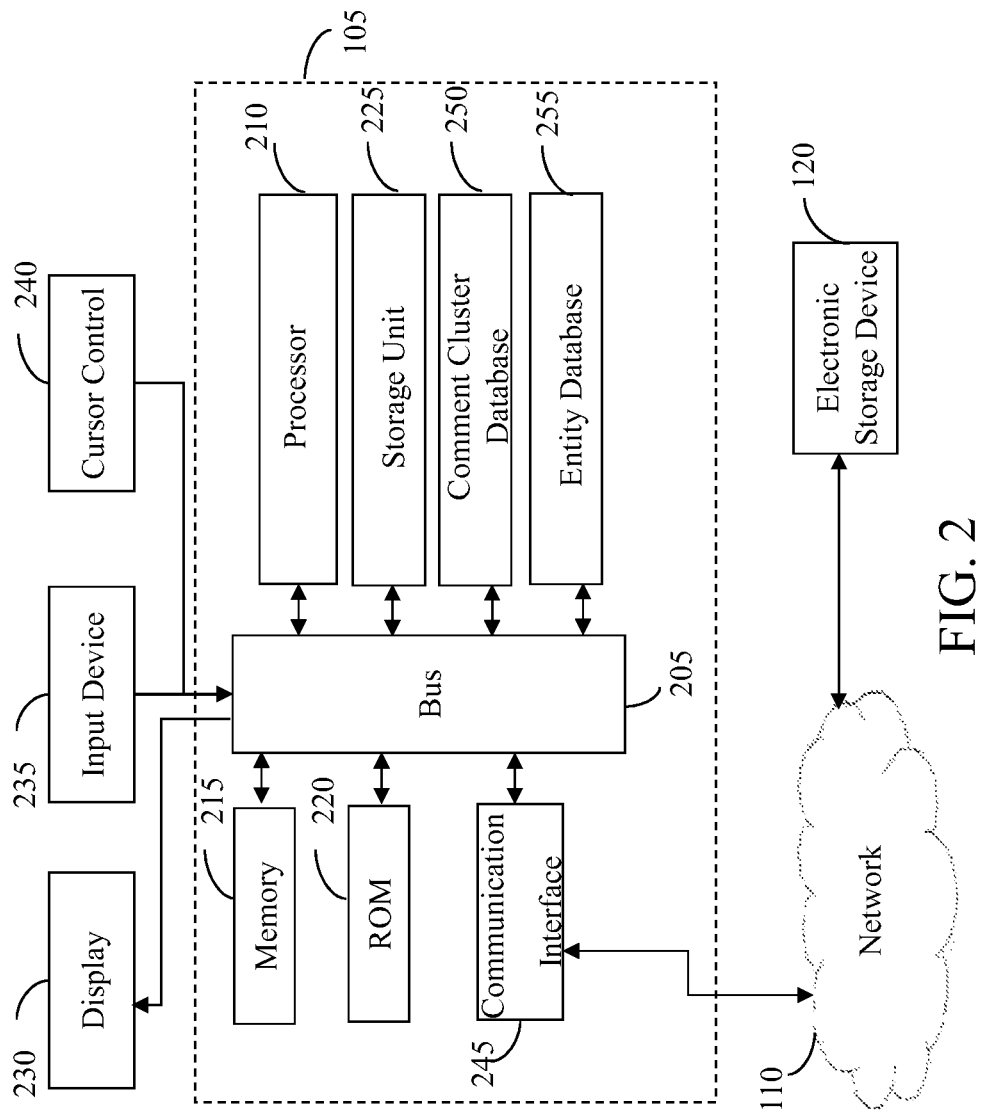
FIG. 2 is a block diagram of a server, in accordance with one embodiment.

The server 105 including a plurality of elements is explained in detail in conjunction with FIG. 2.

FIG. 2 is a block diagram of the server 105, in accordance with one embodiment.

The server 105 includes a bus 205 or other communication mechanism for communicating information, and a processor 210 coupled with the bus 205 for processing information. The server 105 also includes a memory 215, for example a random access memory (RAM) or other dynamic storage device, coupled to the bus 205 for storing information and instructions to be executed by the processor 210. The memory 215 can be used for storing temporary variables or other intermediate information during execution of instructions by the processor 210. The server 105 further includes a read only memory (ROM) 220 or other static storage device coupled to the bus 205 for storing static information and instructions for the processor 210. A storage unit 225, for example a magnetic disk or optical disk, is provided and coupled to the bus 205 for storing information, for example a plurality of articles and a plurality of user comments.

The server 105 can be coupled via the bus 205 to a display 230, for example a cathode ray tube (CRT), and liquid crystal display (LCD) for displaying trends and one or more user comments. An input device 235, including alphanumeric and other keys, is coupled to the bus 205 for communicating information and command selections to the processor 210. Another type of user input device is a cursor control 240, for example a mouse, a trackball, or cursor direction keys for communicating direction information and command selections to the processor 210 and for controlling cursor movement on the display 230. The input device 235 can also be included in the display 230, for example a touch screen.

Various embodiments are related to the use of the server 105 for implementing the techniques described herein. In some embodiments, the techniques are performed by the server 105 in response to the processor 210 executing instructions included in the memory 215. Such instructions can be read into the memory 215 from another machine-readable medium, for example the storage unit 225. Execution of the instructions included in the memory 215 causes the processor 210 to perform the process steps described herein.

In some embodiments, the processor 210 can include one or more processing units for performing one or more functions of the processor 210. The processing units are hardware circuitry used in place of or in combination with software instructions to perform specified functions.

The term "machine-readable medium" as used herein refers to any medium that participates in providing data that causes a machine to perform a specific function. In an embodiment implemented using the server 105, various machine-readable media are involved, for example, in providing instructions to the processor 210 for execution. The machine-readable medium can be a storage medium, either volatile or non-volatile. A volatile medium includes, for example, dynamic memory, for example the memory 215. A non-volatile medium includes, for example, optical or magnetic disks, for example the storage unit 225. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic media, a CD-ROM, any other optical media, punchcards, papertape, any other physical media with patterns of holes, a RAM, a PROM, and EPROM, a FLASH-EPROM, any other memory chip or cartridge.

In another embodiment, the machine-readable media can be transmission media including coaxial cables, copper wire and fiber optics, including the wires that comprise the bus 205. Transmission media can also take the form of acoustic or light waves, such as those generated during radio-wave and infra-red data communications. Examples of machine-readable media may include, but are not limited to, a carrier wave as described hereinafter or any other media from which the server 105 can read, for example online software, download links, installation links, and online links. For example, the instructions can initially be carried on a magnetic disk of a remote computer. The remote computer can load the instructions into its dynamic memory and send the instructions over a telephone line using a modem. A modem local to the server 105 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on the storage unit 225 either before or after execution by the processor 210. All such media must be tangible to enable the instructions carried by the media to be detected by a physical mechanism that reads the instructions into a machine.

The server 105 also includes a communication interface 245 coupled to the bus 205. The communication interface 245 provides a two-way data communication coupling to the network 110. For example, the communication interface 245 can be an integrated services digital network (ISDN) card or a modem to provide a data communication connection to a corresponding type of telephone line. As another example, the communication interface 245 can be a local area network (LAN) card to provide a data communication connection to a compatible LAN. Wireless links can also be implemented. In any such implementation, the communication interface 245 sends and receives electrical, electromagnetic or optical signals that carry digital data streams representing various types of information.

The server 105 is also connected to the electronic storage device 120 to store the plurality of articles and the plurality of user comments.

The server 105 further includes a comment cluster database 250 and an entity database 255. The comment cluster database 250 stores comment clusters generated for the plurality of articles and the entity database 255 stores sets of representative entities for each of the comment clusters.

The processor 210 in the server 105, for example a Yahoo!® server, determines a plurality of articles, from one or more websites, in relation to a first entity for a time period, the first entity being a trending term. The processor 210 generates comment clusters for the articles, each comment cluster generated for an associated article and including a plurality of user comments. The processor 210 also extracts one or more entities from the user comments for each of the comment clusters, the entities related to the first entity. The processor 210 further enables selection of a second entity, from the one or more entities, by the user. The processor 210 further renders one or more user comments corresponding to the first entity and the second entity for the time period. Hence, on receiving the first entity and the time period as inputs from the user, the processor 210 generates the entities and the one or more user comments that are further displayed to the user.

Figure 3:
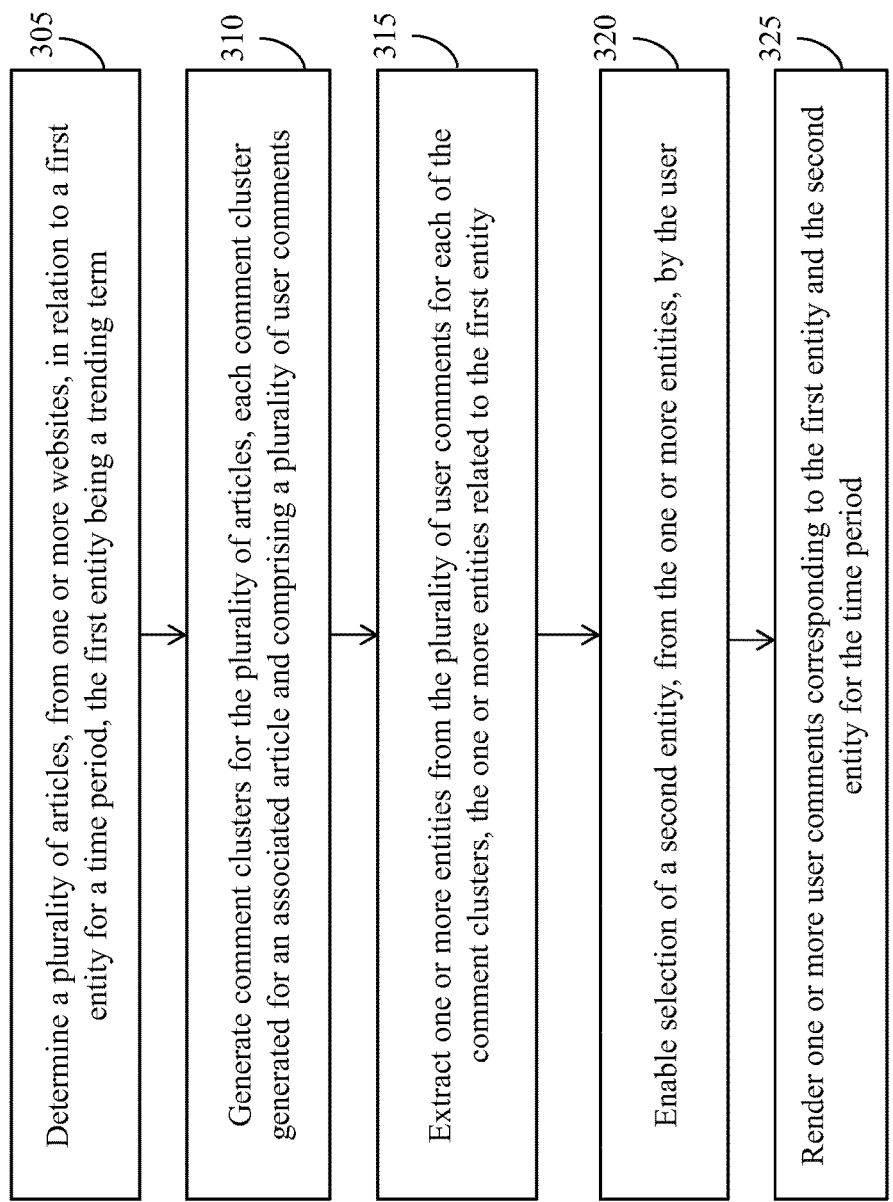
FIG. 3 is a flowchart illustrating a method of mining trends around trending terms, in accordance with one embodiment.

FIG. 3 is a flowchart illustrating a method of mining trends around trending terms, in accordance with one embodiment.

At step 305, a plurality of articles, from one or more websites, are determined in relation to a first entity for a time period. The first entity is a trending term and the articles are related to the first entity. In one example, the articles can be determined from different Yahoo!® websites for month of March. The first entity and the time period can be submitted by the user. The user can select the first entity via a mouse click and can enter or select the time period into an input box.

In some embodiments, the articles can be stored in an electronic storage device, for example the electronic storage device 120.

In other embodiments, the articles can be stored in a storage unit, for example the storage unit 225, in a server, for example the server 105. In one example, the server can be a centralized server or a distributed server of Yahoo!®.

At step 310, comment clusters for the articles are generated. Each comment cluster is generated for an associated article and includes a plurality of user comments. Each article includes the user comments which can further be grouped into one or more comment clusters.

In some embodiments, the user comments of each comment cluster are grouped in a semantic order.

In some embodiments, the comment clusters for the articles can be stored in a comment cluster database, for example the comment cluster database 250.

In some embodiments, the user comments can be stored in the electronic storage device, for example the electronic storage device 120. In other embodiments, the user comments can be stored in the storage unit, for example the storage unit 225.

At step 315, one or more entities are extracted from the user comments for each of the comment clusters. The entities are related to the first entity. The entities are the trends that are mined around the first entity which is the trending term.

In some embodiments, the entities are extracted based on frequency of occurrence and can be ranked accordingly.

In some embodiments, the entities are extracted using one or more extraction algorithms or using an automated machine learned process.

The entities are further displayed to the user.

In some embodiments, based on the inputs of the first entity and the time period, the comment clusters and the entities can be retrieved from a comment cluster database and an entity database respectively and further displayed to the user.

At step 320, selection of a second entity, by the user, from the entities is enabled. The second entity can be selected from the entities as desired by the user.

In some embodiments, the first entity and the second entity together form a set of representative entities for a corresponding comment cluster.

In some embodiments, sets of representative entities for each of the comment clusters can be stored in an entity database, for example the entity database 255.

At step 325, one or more user comments corresponding to the first entity and the second entity are rendered for the time period. The one or more user comments are rendered based on one or more attributes, for example ranking and relevancy. Hence, the user is able to view relevant user comments for the entities selected by the user.

In some embodiments, the one or more user comments also determine development of a relationship between the first entity and the second entity over the time period.

In some embodiments, the entities and the user comments are displayed in extensible markup language (XML) format or in hypertext markup language (HTML) format.

In one example, a user clicks on a trending term or a first entity of Barack Obama. The user also provides an input of month of March as time period. Based on such inputs, system determines a plurality of articles, from one or more Yahoo!® websites, in relation to Barack Obama for the month of March. Comment clusters for the articles are then generated, each comment cluster generated for an associated article and including a plurality of user comments. One or more entities, for example Michelle Obama, Mitt Romney, and Joe Biden, are then extracted from the user comments for each of the comment clusters. The entities are related to the first entity, Barack Obama, and are further displayed to the user. The entities are the trends that are mined around the first entity which is the trending term. The entities extracted can be ordered based on a frequency of occurrence in the user comments. In some embodiments, based on the inputs, the comment clusters and sets of representative entities can be retrieved from a comment cluster database and an entity database. The user can select a second entity, for example Mitt Romney, from the entities based on the frequency of occurrence or as a personal choice. The first entity and the second entity, Barack Obama and Mitt Romney, hence form a set of representative entities for a corresponding comment cluster. One or more user comments corresponding to the first entity and the second entity are then rendered to the user for the time period of March. Hence, the user understands development of a relationship between Barack Obama and Mitt Romney via the one or more user comments that also engages interest of the user.

The present disclosure mines trends that are popular around a trending term or a given entity during a given period of time. The present disclosure can also enables a user to understand trending or popularity of the entity during a given time period, and to explore evolution of trends around the entity over time. Hence, the method and system in the present disclosure enables Yahoo! to highlight engaging discussions by rendering one or more user comments for a pair of trending entities.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method of mining trends around trending terms, the method comprising:
    receiving a user input specifying a trending term and a time period;
    retrieving a plurality of articles related to the trending term from one or more websites, wherein the plurality of articles were generated during the time period specified in the user input;
    generating a comment cluster for each of the plurality of articles, wherein each comment cluster comprises a plurality of user comments submitted in relation to the plurality of articles;
    extracting one or more terms from the plurality of user comments for each of the comment clusters based on a frequency of occurrence of the one or more terms, the one or more extracted terms being related to the trending term specified in the user input, being different than the trending term, and pertaining to subject matter of at least one of the plurality of user comments;
    displaying the one or more extracted terms, each of the one or more displayed terms being selectable by a user; and
    displaying one or more user comments of the generated comment clusters containing both the trending term and a selected term of the one or more displayed terms.

2. The method as claimed in claim 1 and further comprising storing the comment clusters in a comment cluster database.

3. The method as claimed in claim 1, wherein the plurality of user comments of each comment cluster are grouped in a semantic order.

4. The method as claimed in claim 1, wherein the one or more terms are the trends.

5. The method as claimed in claim 1, wherein the trending term is a trending entity, and trending entity and the selected term together form a set of representative entities for a corresponding comment cluster.

6. The method as claimed in claim 1 and further comprising storing sets of representative entities for each of the comment clusters in an entity database.

7. The method as claimed m claim 1, wherein the one or more user comments are rendered based on ranking.

8. The method as claimed in claim 1 and further comprising determining development of a relationship between the trending term and the selected term.

9. A non-transitory computer-readable medium, comprising:
    instructions executable by a processor to determine a plurality of articles, from one or more websites, in relation to a trending term specified by a user input for a time period;
    instructions executable by a processor to generate comment clusters for the plurality of articles, each comment cluster generated for an associated article and comprising a plurality of user comments submitted on the associated article;
    instructions executable by a processor to extract one or more terms from the plurality of user comments for each of the comment clusters based on a frequency of occurrence of the one or more terms, the one or more extracted terms being related to the trending term specified by the user input, being different than the trending term, and pertaining to subject matter of at least one of the plurality of user comments;
    instructions executable by a processor to display the one or more extracted terms, each of the one or more displayed terms being selectable; and
    instructions executable by a processor to display one or more user comments of the generated comment clusters corresponding to both of the trending term and a selected term of the one or more displayed terms.

10. The medium as claimed in claim 9 and further comprising instructions executable by a processor to store the comment clusters in a comment cluster database.

11. The medium as claimed in claim 9, wherein the plurality of user comments of each comment cluster are grouped in a semantic order.

12. The medium as claimed in claim 9, wherein the one or more extracted terms are mined trends related to trending term.

13. The medium as claimed in claim 9, wherein the trending term and the selected term together form a set of representative entities for a corresponding comment cluster.

14. The medium as claimed in claim 9 and further comprising instructions executable by a processor to store sets of representative entities for each of the comment clusters in an entity database.

15. The medium as claimed in claim 9, wherein the one or more user comments are rendered based on ranking.

16. The medium as claimed in claim 9 and further comprising instructions executable by a processor to determine development of a relationship between the trending term and the selected term.

17. The medium as claimed in claim 9, wherein the one or more displayed terms are selectable by a user.

18. A system for mining trends around trending terms, the system comprising:
   an electronic device;
   a communication interface in electronic communication with the electronic device;
   a memory that stores instructions; and
   a processor responsive to the instructions to:
   determine a plurality of articles, from one or more websites, in relation to a trending term specified by a user input for a time period;
   generate comment clusters for the plurality of articles, each comment cluster generated for an associated article and comprising a plurality of user comments;
   extract one or more terms from the plurality of user comments for each of the comment clusters based on a frequency of occurrence of the one or more terms, the one or more terms related to the trending term, being different than the trending term, and pertaining to subject matter of at least one of the plurality of user comments;
   display the one or more extracted terms, each of the one or more displayed terms being selectable; and
   display one or more user comments of the generated comment clusters corresponding to the trending term and a selected term of one or more displayed terms.

19. The system as claimed in claim 18 and further comprising an electronic storage device that stores the plurality of articles, and the plurality of user comments.

20. The system as claimed in claim 18, wherein the trending term and the selected term together form a set of representative entities for a corresponding comment cluster.

21. The system as claimed in claim 18 and further comprising:
   a comment cluster database that stores the comment clusters; and
   an entity database that stores sets of representative entities for each of the comment clusters.

22. The system as claimed in claim 18, wherein the one or more displayed terms are selectable by a user.

* * * * *